United States Patent
Whelan et al.

(10) Patent No.: US 10,808,121 B2
(45) Date of Patent: Oct. 20, 2020

(54) POLYOLEFIN-BASED ELASTOMER MODIFIED POLYETHYLENE TEREPHTHALATE BLENDS WITH ENHANCED NOTCHED IMPACT STRENGTH

(71) Applicant: ExxonMobil Chemical Patents Inc., Baytown, TX (US)

(72) Inventors: Declan N. Whelan, Rugby (GB); Martin Machado, Brussels Capital Region (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 65 days.

(21) Appl. No.: 16/155,068

(22) Filed: Oct. 9, 2018

(65) Prior Publication Data

US 2019/0112472 A1   Apr. 18, 2019

Related U.S. Application Data

(60) Provisional application No. 62/571,499, filed on Oct. 12, 2017.

(51) Int. Cl.
*C08L 67/02* (2006.01)
*C08L 23/16* (2006.01)
*C08L 33/10* (2006.01)

(52) U.S. Cl.
CPC ............. *C08L 67/02* (2013.01); *C08L 23/16* (2013.01); *C08L 33/10* (2013.01); *C08L 2205/03* (2013.01); *C08L 2205/08* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 5,280,066 A | 1/1994 | Tekkanat et al. | |
| 5,436,296 A | 7/1995 | Swamikannu et al. | |
| 5,571,865 A * | 11/1996 | Nishikawa | C08L 23/12 525/98 |
| 8,975,305 B2 | 3/2015 | Topolkaraev et al. | |
| 2002/0091196 A1 * | 7/2002 | Mori | C08L 67/02 525/107 |
| 2003/0153684 A1 | 8/2003 | Miller | |
| 2012/0184666 A1 * | 7/2012 | Gusain | C08J 5/18 524/528 |

FOREIGN PATENT DOCUMENTS

JP   2005008679   *  1/2005

OTHER PUBLICATIONS

Loyens, Phase Morphology Development on Reactively Compatibilized Polyethylene Terephthalate/Elastomer Blends; Macromol Chem Phys (2002), 203 pp. 1702-1714. (Year: 2002).*
Chapleau et al., "Impact Modicifaction of Poly(ethylene terephthalate)", Journal of Applied Polymer Science, vol. 90, (2003), pp. 2919-2932.
Fung et al., "A study on the fracture characteristics of rubber toughened poly(ethylene terephthalate) blends", Polymer Testing, vol. 24, (2005), pp. 863-872.
Jiang, et al., "Effect on nucleating agents on crystallization kinetics of PET", eXPRESS Polymer Letters, vol. 1, No. 4, (2007), pp. 245-251.
Scheirs, "Additives for the Modification of Poly(Ethylene Terephthalate) to Poduce Engineering-Grade Polymers", Chapter 14 in Modern Polyesters: Chemistry and Technology of Polyesters and Copolyesters, (2003), pp. 495-540.
Authors et al., Disclosed Anonymously, "PET Toughness Improvement Improvement by Adding Vistamaxx™ Performance Polymers", IP.com No. IPCOM000246892D, IP.com Electronic Publication Date: Jul. 12, 2016.

* cited by examiner

*Primary Examiner* — David J Buttner

(57) ABSTRACT

A thermoplastic polymer blend having improved impact performance includes from about 50 wt % to about 98 wt % polyethylene terephthalate (PET), a polymeric toughening agent and a compatibilizer. The compatibilizer is a functionalized polyolefin, a thermoplastic copolymer or a thermoplastic terpolymers. The ratio of wt % compatibilizer to wt % polymeric toughening agent, based on the total weight of the thermoplastic polymer blend, is from about 0.1 to about 0.4.

20 Claims, 5 Drawing Sheets

POLYOLEFIN-BASED ELASTOMER MODIFIED POLYETHYLENE TEREPHTHALATE BLENDS WITH ENHANCED NOTCHED IMPACT STRENGTH

CROSS-REFERENCE OF RELATED APPLICATIONS

This application claims the benefit of Provisional Application No. 62/571,499, filed Oct. 12, 2017, the disclosure of which is incorporated herein by its reference.

FIELD

This invention relates to a polymer compositions, particularly polymer blends having an enhanced notched impact strength.

BACKGROUND

Polyethylene terephthalate (PET) is a low cost engineering thermoplastic polymer. PET offers a good balance of thermal and mechanical properties with a high glass transition temperature (>60° C.) and high stiffness (elastic modulus ~2.5 GPa). PET is recyclable and recovered PET may be used in a variety of applications through different recycling procedures. Due to its low cost, widespread availability from recycled beverage bottles and high molecular weight, PET can be used as precursor for engineering compounds which could compete with toughened nylons, while having a considerable cost advantage.

Polyesters, including PET, are generally tough in unnotched situations, but notch-type defects can lead to brittle failures due to high stress concentrations at the notch. The impact strength of polyester may be increased by incorporating elastomeric inclusions, which promote elastic behavior. U.S. Pat. No. 8,975,305 describes high impact strength and tensile elongation blends achieved by blending a renewable polyester, a toughening additive, an interphase modifier and a polyepoxide modifier.

Polyolefin-based elastomers have been used as impact modifiers, but the toughening effect is mitigated by low compatibility between the nonpolar impact modifier and the polar PET matrix. As such, a need currently exists for thermoplastic polyethylene terephthalate blends with high notched impact strength that can be used to mold rigid articles with better impact performance.

SUMMARY

In one aspect, the invention provides a thermoplastic polymer blend having improved impact performance. In an embodiment, the thermoplastic polymer blend includes a polyethylene terephthalate (PET), a polymeric toughener and a compatibilizer. The thermoplastic blend includes from about 50 wt % to about 98 wt % PET. In an embodiment, the ratio of wt % compatibilizer to wt % polymeric toughening agent, based on the total weight of the thermoplastic polymer blend, is from about 0.1 to about 0.4. In another embodiment, the ratio of wt % compatibilizer to wt % polymeric toughening agent, based on the total weight of the thermoplastic polymer blend, is from about 0.25 to about 0.35.

The thermoplastic polymer blend may include from about 1 wt % to about 30 wt %, or from about 5 wt % to about 15 wt % of the polymeric toughening agent based on the total weight of the thermoplastic polymer blend. The polymeric toughening agent may be a propylene-based elastomer. The thermoplastic polymer blend may include from about 0.25 wt % to about 10 wt %, or from about 2 wt % to about 4 wt % of the compatibilizer based on the total weight of the thermoplastic polymer blend.

DEFINITIONS

Figure 1:
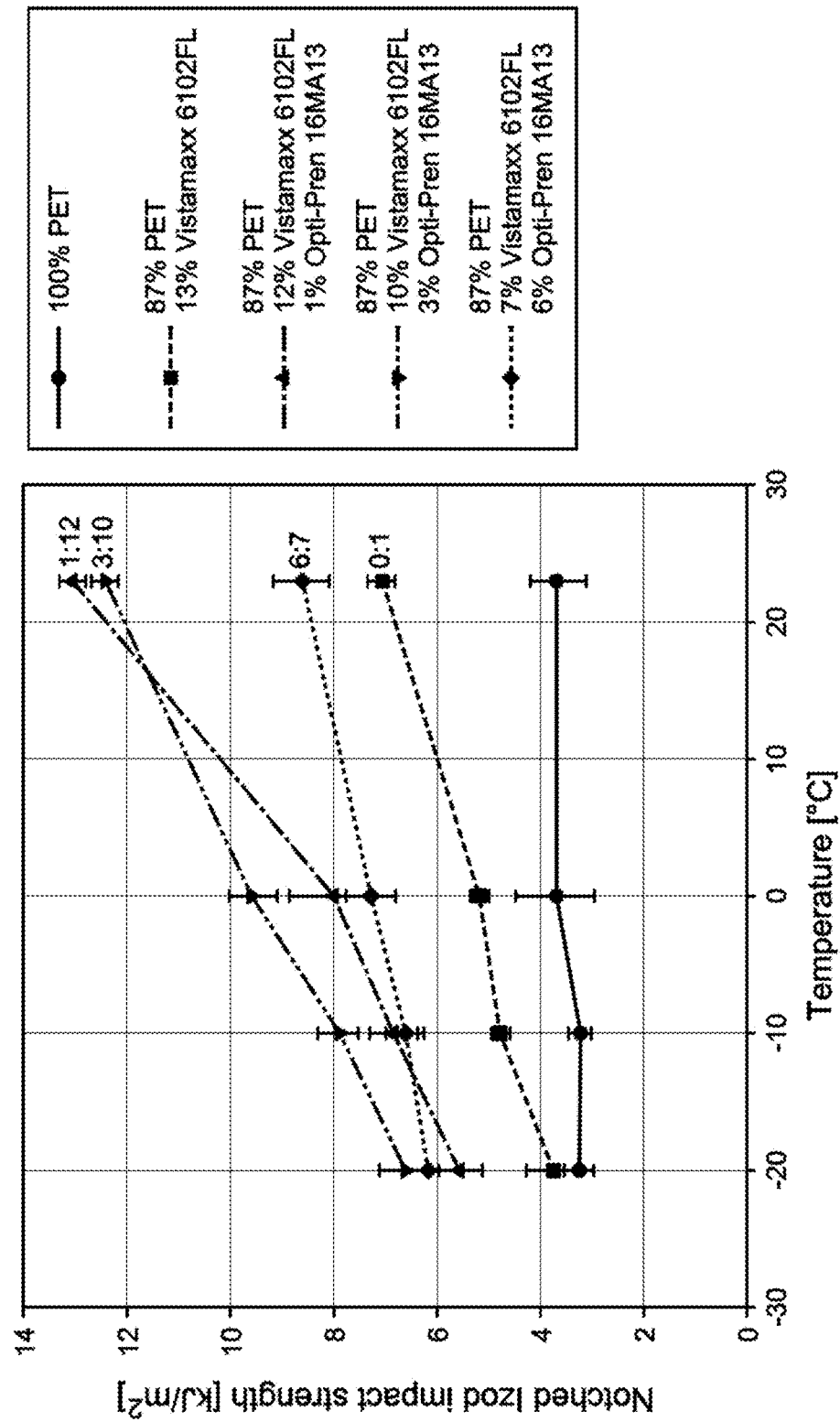
FIG. 1 illustrates a plot of notched Izod impact strength versus temperature for comparative polymers and thermoplastic polymer blends according to an embodiment of the invention.

For purposes of this disclosure and the claims appended thereto, the new numbering scheme for the Periodic Table Groups is used as described in CHEMICAL AND ENGINEERING NEWS, 63(5), p. 27 (1985).

An "olefin", alternatively referred to as "alkene", is a linear, branched, or cyclic compound of carbon and hydrogen having at least one double bond. For the purposes of this invention, ethylene shall be considered an α-olefin. An "alkene" group is a linear, branched, or cyclic radical of carbon and hydrogen having at least one double bond.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

The term "propylene-based elastomer" (PBE) means a random propylene homopolymer or copolymer having crystalline regions interrupted by non-crystalline regions. The non-crystalline regions may result from regions of non-crystallizable polypropylene segments and/or the inclusion of comonomer units. The crystallinity and the melting point of the propylene-based elastomer are reduced compared to highly isotactic polypropylene by the introduction of errors in the insertion of propylene and/or by the presence of comonomer. The propylene-based elastomer generally comprises at least 60 wt % propylene-derived units, and in particular embodiments, the propylene-based elastomer comprises at least 75 wt %, or at least 80 wt %, or at least 90 wt % propylene-derived units. The crystallinity of the propylene-based elastomer can also be expressed in terms of crystallinity percent. The thermal energy for the highest order of polypropylene is estimated at 189 J/g. That is, 100% crystallinity is equal to 189 J/g. Therefore, in particular embodiments, the propylene-based elastomer has a propylene crystallinity within the range having an upper limit of 65%, or 40%, or 30%, or 25%, or 20%, and a lower limit of 1%, or 3%, or 5%, or 7%, or 8%. The level of crystallinity is also reflected in the melting point. In particular embodiments, the propylene-based elastomer has a melting point by DSC ranging from an upper limit of 110° C., or 105° C., or 90° C., or 80° C., or 70° C. to a lower limit of 0° C., or 20° C., or 25° C., or 30° C., or 35° C., or 40° C., or 45° C.

In some embodiments, the crystallinity of the propylene-based elastomer is controlled by the copolymerization of propylene with limited amounts of one or more comonomers selected from: ethylene, $C_4$-$C_{20}$ alpha-olefins, and polyenes. In these copolymers, the amount of propylene-derived units present in the propylene-based elastomer ranges from an upper limit of 99.9 wt %, or 97 wt %, or 95 wt %, or 94 wt %, or 92 wt %, or 90 wt %, or 85 wt % to a lower limit of 60 wt %, 68 wt %, or 70 wt %, or 71 wt %, or 75 wt %, or 76 wt %, or 80 wt %, based on the total weight of the propylene-based elastomer. The amount of optional units derived from ethylene and/or C4-C20 alpha-olefins present in the propylene-based elastomer ranges from an upper limit of 40 wt %, or 35 wt %, or 30 wt %, or 28 wt %, or 25 wt %, or 20 wt %, or 15 wt % to a lower limit of 0 wt %, or 0.5 wt %, or 1 wt %, or 2 wt %, or 3 wt %, or 5 wt %, or 6 wt %, or 8 wt %, or 10 wt %, based on the total weight of the propylene-based elastomer. The amount of optional polyene-derived units present in the propylene-based elastomer ranges from an upper limit of 25 wt %, or 20 wt %, or 15 wt %, or 10 wt %, or 7 wt %, or 6 wt %, or 5 wt %, or 4.5 wt %, or 3 wt %, or 2.5 wt %, to a lower limit of 0 wt %, or 0.1 wt %, or 0.2 wt %, or 0.3 wt %, or 0.5 wt %, or 1 wt %, or 1.5 wt % based on the total weight of the propylene-based elastomer.

The term "melting point" or "peak melting temperature" as used herein is the highest peak among principal and secondary melting peaks, as determined by DSC.

The presence of multiple phases is determined using microscopy techniques, e.g., optical microscopy, scanning electron microscopy (SEM), or atomic force microscopy (AFM); or by the presence of two glass transition (Tg) peaks in a dynamic mechanical analysis (DMA) experiment; or by a physical method such as solvent extraction, e.g., xylene extraction at an elevated temperature to preferential separate one polymer phase; in the event of disagreement among these methods, DMA performed according to the procedure set out in US 2008/0045638 at page 36, including any references cited therein, shall be used.

Ambient temperature, also referred to herein as room temperature (RT), is 23° C.±3° C. unless otherwise indicated.

In embodiments, the heterophasic propylene polymer composition produced herein, e.g., comprising fill rubber, or produced with phased hydrogen supply, and/or produced after time period B when specified, may be referred to herein as an impact copolymer, or a propylene impact copolymer, or an in-reactor propylene impact copolymer, or an in-reactor propylene impact copolymer composition, and such terms are used interchangeably herein.

Polarity refers to the separation of electric charge, which generates an electric dipole or multipole moment in a molecule, macromolecule (e.g. polymers) or its chemical groups.

As used herein, "and/or" means either or both (or any or all) of the terms or expressions referred to, and "and or" means the earlier one(s) of the terms or expressions referred to or both (all) of the terms or expressions referred to, i.e., the later term or expression is optional.

As used herein "consisting essentially of" means that the described/claimed composition does not include any other components that will materially alter its properties by any more than 5% of that property, and in any case, does not include any other component to a level greater than 3 wt %.

DETAILED DESCRIPTION

A thermoplastic polymer blend that contains a polyethylene terephthalate (PET), a polymeric toughener and a compatibilizer is provided. In one aspect, the thermoplastic polymer blend is more flexible than the PET alone. In another aspect, the thermoplastic polymer blend exhibits superior notched impact strength over a wide range of temperatures as compared to the PET alone. In another aspect, the inventors have found that thermoplastic polymer blends disclose herein surprisingly exhibit a higher crystallization temperature than the component PET alone. Higher crystallization temperatures may allow for molding of tougher articles in shorter cycle times, increasing productivity and improving end application performance.

In an embodiment, the thermoplastic polymer blend includes a PET matrix phase and a dispersed polymeric toughening agent. Dispersing a polymeric toughening agent within the rigid PET matrix is an effective way to increase the impact strength of PET based compounds. Without wishing to be bound to theory, it is believed that smaller domains of dispersed polymeric toughening agent lead to superior notched impact performance. Preferably, the thermoplastic polymer blend includes dispersed domains having a mean domain size greater than about 0.1 µm and less than about 1 µm as measured by AFM or SEM. The presence of elastomeric domains promotes a more homogenous and distributed deformation mechanism rather than a localized phenomenon, and considerably increases the amount of energy dissipated during fracture of the material under impact loading.

The efficiency of the polymeric toughening agent strongly depends on the nature of the toughening material, compatibility with the PET matrix, rubber content, size of the rubbery domains, dispersion and distribution in the matrix, and inter-domain distance. The size of the dispersed polymeric toughening agent domains is determined by the type and wt % of compatibilizer. Surprisingly, the inventors have identified an optimum range for the ratio of wt % compatibilizer to wt % polymeric toughening agent of about 0.1 to about 0.4, or preferably from about 0.25 to about 0.35, that provides superior notched impact performance over ratios outside the identified range.

The present invention demonstrates that significant results in terms of impact modification can also be achieved without an polyepoxide modifier when using maleic anhydride grafted (MAH-g-) elastomeric polypropylene copolymer or an ethylene acrylic acid (EAA) copolymer to compatibilize the polymeric toughening agent with the PET.

In an embodiment, the thermoplastic polymer blend includes from about 50 to about 98 wt % PET, from about 75 to about 90 wt % PET, or from about 85 to about 89 wt % PET, based on the total weight of the thermoplastic polymer blend. Any variety of PET may be used in the thermoplastic polymer blend, such as virgin PET, nucleated PET, recycled PET, post-consumer PET, or post-industrial PET. In an embodiment, the PET includes additives to initiate crystallization, increase the degree of crystallization or to increase the crystallization temperature.

In an embodiment, the thermoplastic polymer blend includes from about 1 to about 30 wt % polymeric toughening agent (PTA), or preferably from about 5 to about 15 wt % PTA, based on the total weight of the thermoplastic polymer blend. In an embodiment, the PTA is an elastomer. Examples of suitable elastomers include propylene-based elastomers. In an embodiment, the propylene-based elastomer includes from about 75 wt % to about 97 wt % propylene-derived units and from about 3 wt % to about 20 wt % units derived from ethylene and/or $C_4$ to $C_{12}$ $\alpha$-olefins based on the weight of the propylene-based elastomer. The propylene-based elastomer may have an mm propylene triad tacticity of at least 75% and a heat of fusion of less than 75 J/g. In an embodiment, the propylene-ethylene copolymer has a melt flow rate at 230° C./2.16 kg of less than 50 g/10 min. In an embodiment, the propylene-based elastomer comprises greater than 10 wt % ethylene based on the weight of the propylene-based elastomer.

Propylene-based elastomers possess many of the characteristics needed to improve the notched impact strength of PET. However, propylene-based elastomers are non-polar, and as a result have low compatibility and/or miscibility with polar PET. This lack of compatibility causes low or negligible toughening effects in blends that include only PET and PTA.

The thermoplastic polymer blend may include from about 5 to about 15 wt %, or preferably from about 0.25 to about 10 wt % compatibilizer, based on the total weight of the thermoplastic polymer blend. By introducing a compatibilizer with some polarity, the interface between the PET matrix and the polymeric toughening agent is modified and the polymeric toughening agent can be efficiently dispersed in the matrix. In an embodiment, the compatibilizer is a functionalized polyolefin. One example is a functionalized elastomer. In one embodiment, polyolefins may be functionalized with a functional group that can graft to PET to form a copolymer. Suitable functional groups include any group that provides a polar segment. Particularly suitable compatibilizers include glycidyl methacrylate (GMA) grafted polyolefins, ethylene acrylic acid (EAA) copolymers, and ethylene-acrylic ester-glycidyl methacrylate terpolymers.

The use of either a twin screw compounder or internal Banbury type mixer can be used to produce the blends. The components may be blended using lower temperatures and reduced torques.

The invention will now be more particularly described with reference to the following non-limiting Examples. In the Example 1, properties of thermoplastic polymer blends including PET, polymeric toughening agent, and compatibilizer are compared to PET and a blend of PET and polymeric toughening agent without compatibilizer. In Example 2, thermoplastic polymer blends including different polymeric toughening agents and different compatibilizers were evaluated.

Example 1

The PET-1 resin was a nucleated, medium viscosity injection molding grade commercialized under the trade name of Arnite A04 900 produced by DSM (Netherlands). The PET-1 has a density of 1.37 g/cm3 as measured using ISO 1183, and a melt flow rate of 14 g/10 min as measured using ISO 1133 at 265° C./2.16 kg. The polymeric toughening agent PTA-1 was a propylene-based elastomer commercialized under the trade name of VISTAMAXX™ 6102FL produced by ExxonMobil Chemical Company. PTA-1 includes 16 wt % ethylene copolymer. The compatibilizer C-1 was a MAH-g polypropylene copolymer commercialized by BJØRN THORSEN A/S (Denmark) under the trade name of OPTI-PREN™ 16 MA13 (MAH content: 1.3%). OPTI-PREN™ MA series are maleated elastomeric polypropylene copolymers which can be used as impact modifiers of stiff polar resins or as a coupling agent in reinforced PP and as compatibilizers in polar/nonpolar polymer blends. Furthermore, due to the nature of its backbone, OPTI-PREN™ MA grades are compatible with most polyolefins.

TABLE 1

Sample compositions (wt %)

| | Sample | | | | |
|---|---|---|---|---|---|
| | 1 (comparative) | 2 (comparative) | 3 | 4 | 5 |
| PET-1 | 100 | 87 | 87 | 87 | 87 |
| PTA-1 | — | 13 | 12 | 10 | 7 |
| C-1 | — | — | 1 | 3 | 6 |
| Compatibilizer:modifier ratio | — | 0:1 | 1:12 | 3:10 | 6:7 |

The blends were compounded using a Coperion ZSK 26 MC18 twin-screw extruder with a screw diameter of 26 mm and L/D ratio of 52. The screw design includes three kneading sections. The compounding conditions were: Feed Zone/Zone 1/Zone 2/Zone 4/Zone 5/Zone 6-9/Zone 10-13/Die, cooled/190/200/210/220/260/250/245° C., extruder speed 400 rpm and feed rate 14 kg/h.

The blends were injection molded to produce samples for testing. Injection molding conditions include 70 mm/min injection speed, barrel temperatures Nozzle/Zone 2 &3/Zone 4, 280/290/290/270° C. and mold temperature of 90° C.

TABLE 2

Tensile, Impact, and Flow Properties

| | Sample | | | | |
|---|---|---|---|---|---|
| | 1 | 2 | 3 | 4 | 5 |
| MFR (265° C./2.16 kg) [g/10 min] | 15 | 26 | 27 | 43 | 43 |
| RTNI [kJ/m$^2$] | 3.7 | 7.1 | 13.1 | 12.4 | 8.6 |
| LTNI [kJ/m$^2$] | 3.3 | 3.8 | 5.6 | 6.6 | 6.2 |
| Yield Strength [MPa] | 71.7 | 51.9 | 51.2 | 50.2 | 51.5 |
| Elastic Modulus [GPa] | 2837 | 2038 | 2039 | 2119 | 2069 |
| Flex Modulus [MPa] | 2779 | 1965 | 2006 | 2036 | 2009 |
| Peak melting temp [° C.] | 253.3 | 250.7 | 250.3 | 249.4 | 249.6 |
| Peak crystallization temp [° C.] | 190.0 | 212.5 | 211.2 | 209.5 | 211.5 |

Melt flow rate (MFR) was measured according to a modified ISO 1133 or ASTM D1238 method (230° C., 2.16 kg). MFR is measured in grams of polymer per 10 min (g/10 min or its equivalent unit dg/min and was measured according to (2.16 kg, 230° C.). For reactor granule and/or powder samples that are not stabilized, the following sample preparation procedure is followed before measuring the MFR. A solution of Butylated Hydroxy Toluene (BHT) in hexane is prepared by dissolving 40±1 grams of BHT into 4000±10 ml of hexane. Weigh 10±1 grams of the granule/powder sample into an aluminum weighing pan. Add 10±1 ml of the BHT/hexane solution into the aluminum pan under a Hood. Stir the sample, if necessary, to thoroughly wet all the granules. Place the sample slurry in a vacuum oven at 105°±5° C. for a minimum of 20 min. Remove the sample from the oven and place in a nitrogen purged desiccator a minimum of 15 mins allowing the sample to cool. Measure the MFR following ASTM D1238 procedure.

Notched impact strength (NI) was measured according to a modified ISO 180/1A, at −23° C. (LTNI) and room temperature (RTNI) as per ASTM D256 using equipment made by Empire Technologies Inc.

The tensile strength at yield, elongation at yield and elongation at break were measured as per ASTM D638 or ISO 527, with a crosshead speed of 50 mm/min, using an Instron Machine.

Peak melting temperature and peak crystallization temperature were measured using a differential scanning calorimeter (DSC). DSC measurements were carried out with a TA DSC8000 instrument under N$_2$ atmosphere with a heating/cooling rate of 10 K/min. The samples were heated from −50 to 300° C., held for 5 minutes in order to remove the previous thermal history, then cooled down to −50° C., and then heated again to 300° C.

Flexural and elastic modulus are reduced between 25-30% by the introduction of the polymer toughening agent, independent of the compatibilizer used. MFR is doubled by the addition of PTA-1 and can be tripled if higher amounts of C-1 are included. At room temperature, notched Izod impact strength is doubled by adding 13% of PTA-1. RTNI impact strength for the thermoplastic polymer blends is 3.5 times greater than that of PET-1 when selecting a compatibilizer: modifier ratio of about 0.1 to about 0.4. At −20° C., barely any improvement on notched Izod impact strength is achieved by adding only PTA-1, while impact strength is doubled from 3.3 to 6.6 kJ/m$^2$ when adding a wt % of C-1 that results in a compatibilizer to polymeric toughening agent (C-1:PTA-1) ratio of from about 0.1 to about 0.4.

Samples 2-5, which include the polymeric toughening agent, have peak crystallization temperatures that are greater than the peak crystallization temperature of comparative Sample 1, which does not include the PTA. Without wishing to be bound to theory, the PTA may serve as a nucleator for PET crystallization. Higher crystallization temperatures may allow for molding of tougher articles in shorter cycle times, increasing productivity and improving end application performance. In an embodiment, the thermoplastic polymer blend has a peak crystallization temperature greater than 200° C.

The thermoplastic polymer blends, Samples 3-5, exhibit improved impact strength over a wide temperature range as compared to Samples 1 and 2. FIG. 1 illustrates a plot of temperature [° C.] versus notched Izod impact strength (kJ/m$^2$) for each of Samples 1-5. Notched Izod impact strength of neat PET-1 resin shows almost no variation over the studied temperature range and remains relatively low, below 4 kJ/m$^2$. The toughening effect of polymeric toughening agent PTA-1 without compatibilizer C-1 is reduced as temperature decreases, converging with neat PET-1 at approximately −20° C. By adding from about 1% to about 3% of compatibilizer C-1, the toughening effect of the PTA-1 is maintained. For Samples 3 and 4, not only is the notched impact strength at room temperature considerably high for a PET (over 12 kJ/m$^2$) but also at −20° C. impact strengths above 6 kJ/m$^2$ can be obtained.

Figure 2:
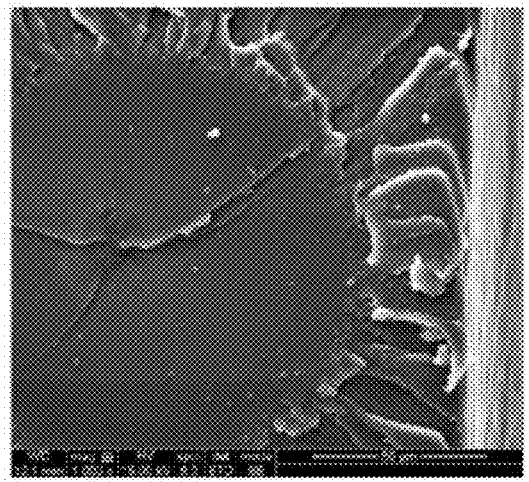
FIG. 2 illustrates a scanning electron micrograph of PET.
Figure 3:
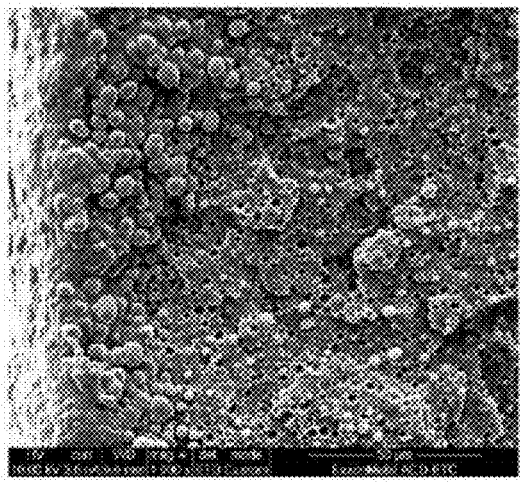
FIG. 3 illustrates a scanning electron micrograph of a polymer blend of PET and a polymeric toughening agent.
Figure 4:
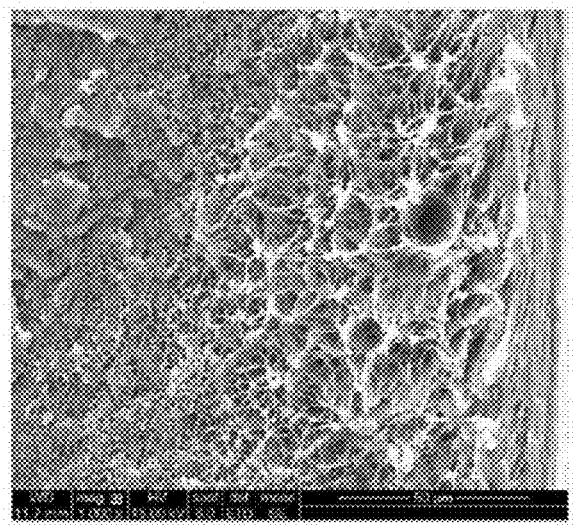
FIG. 4 illustrates a scanning electron micrograph of a thermoplastic polymer blend, according to an embodiment of the invention.
Figure 5:
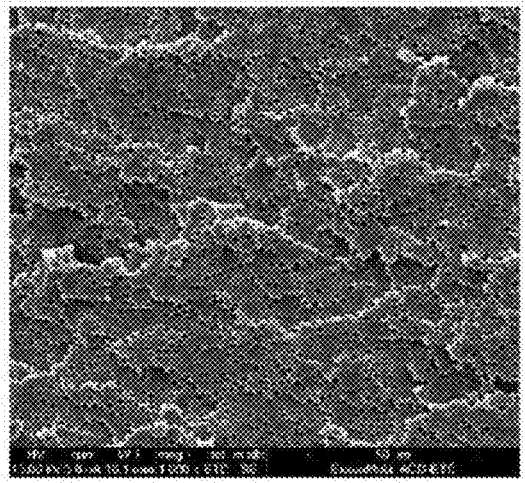
FIG. 5 illustrates a scanning electron micrograph of a polymer blend of PET and a polymeric toughening agent.
Figure 6:
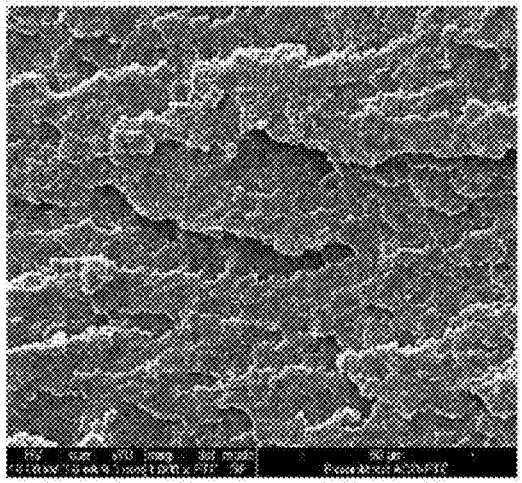
FIG. 6 illustrates a scanning electron micrograph of a thermoplastic polymer blend, according to an embodiment of the invention.
Figure 7:
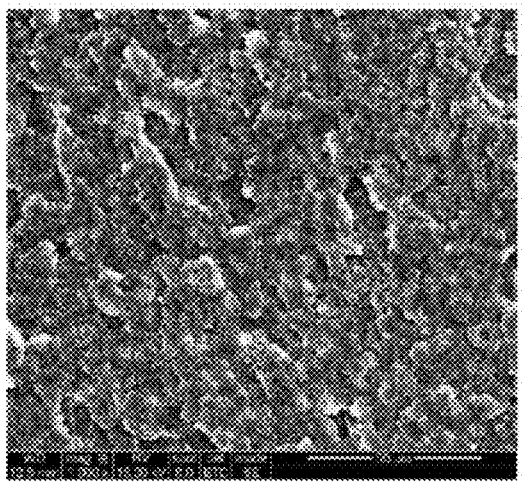
FIG. 7 illustrates a scanning electron micrograph of a thermoplastic polymer blend, according to an embodiment of the invention.
Figure 8:
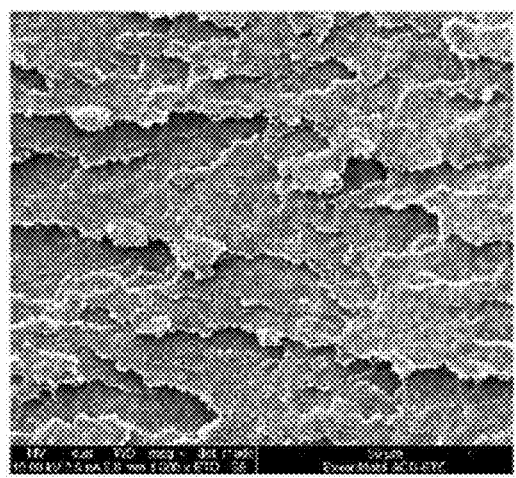
FIG. 8 illustrates a scanning electron micrograph of a thermoplastic polymer blend, according to an embodiment of the invention.

A comparison between the fracture surfaces of neat PET, blends including PTA, and thermoplastic polymer blends including both PTA and compatibilizer is presented in FIGS. 2-4. FIG. 2 illustrates Sample 1, neat PET-1. The fracture surface is relatively flat and featureless, indicating rapid crack propagation and brittle behavior. FIG. 3 illustrates Sample 2, a blend of PET-1 and PTA-1. When a polymeric toughening agent having low compatibility with PET is added, in this case PTA-1, the crack propagates following the lowest energy path along the PET/PTA interfaces from one elastomeric domain to the next, generating extra superficial area. Due to the extra superficial area, slightly higher impact strength is obtained. However, little plastic deformation is observed, suggesting that the PET could have been strained further allowing for additional improvement of impact strength. FIG. 4 illustrates Sample 4, a blend of 87 wt % PET-1, 10 wt % PTA-1, and 3 wt % C-1, according to an embodiment of the invention. FIG. 4 illustrates more generalized plastic behavior due to the stronger interface between PET-1 and PTA-1. This may indicate that the addition of compatibilizer in an appropriate ratio to the polymer toughening agent creates a stronger bond between polymeric toughening agent domains and the PET matrix. The stronger interface requires more energy to fracture the material, thereby enhancing the notched impact strength.

SEM micrographs were obtained using a FEI Quanta 400 on cryo-faced surfaces. The PTA was extracted in toluene at 90° C. in two steps of 10 min each. Samples were dried, mounted on a step and metalized with a gold/palladium to enable SEM imaging.

FIGS. 5-8 illustrate the fracture surface of Samples 2-5, respectively, tested at 0° C. after the PTA was extracted in toluene at 80° C. for 20 minutes. It can be seen that the size of PTA domains decreases as the amount of compatibilizer increases.

Figure 9:
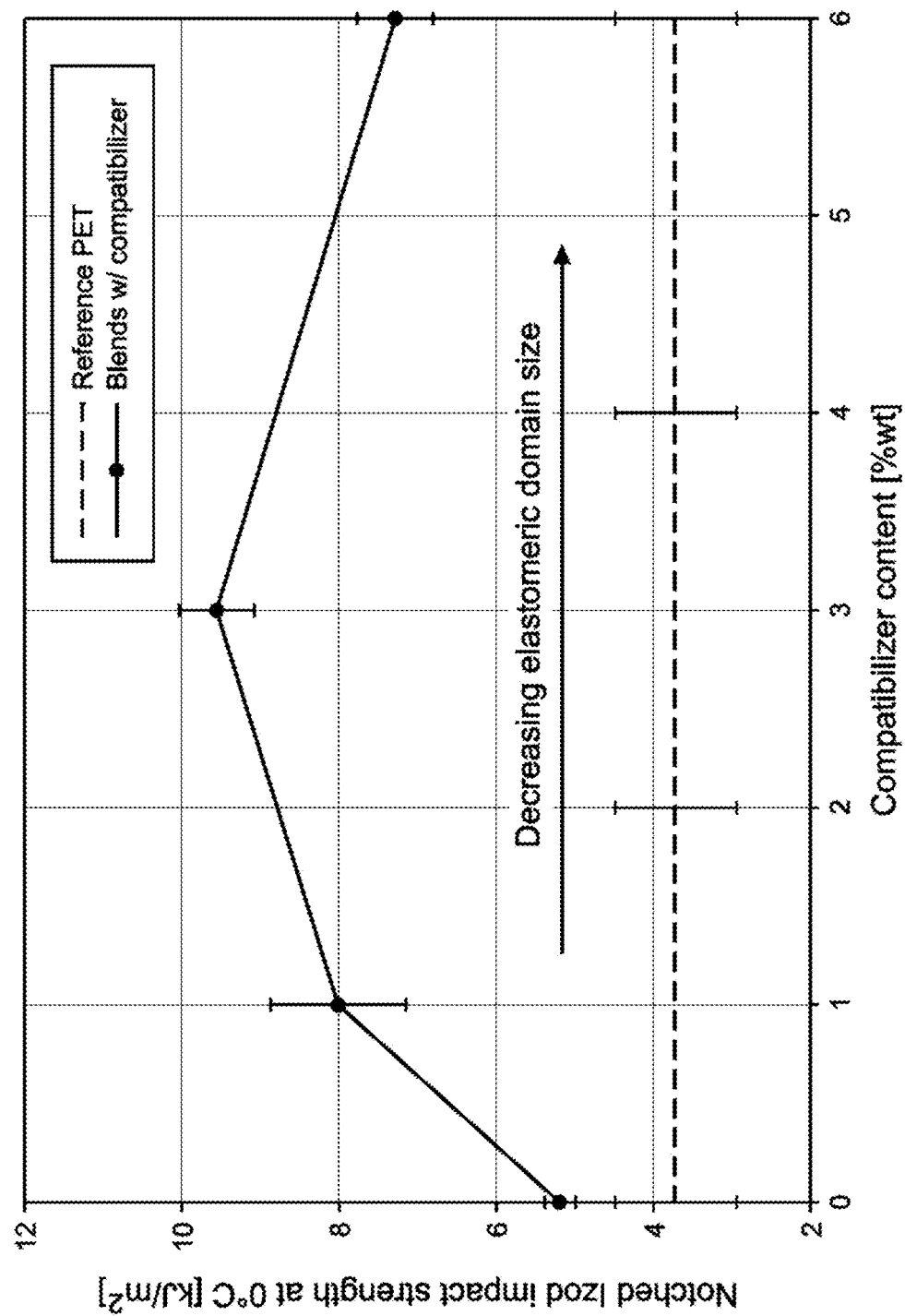
FIG. 9 illustrates a plot of notched Izod impact strength versus compatibilizer content for comparative polymers and thermoplastic polymer blends according to an embodiment of the invention.

FIG. 9 illustrates a plot of notched Izod impact strength at 0° C. versus compatibilizer content (wt %) for Samples 2-5. The maximum notched Izod impact strength is associated with a compatibilizer:PTA ratio between 1:12 and 3:10. Sample 4, containing higher loadings of compatibilizer and a compatibilizer:PTA ratio of 6:7, showed lower notched Izod impact strength than blends having compatibilizer:PTA ratios within the range of about 0.1 to about 0.4.

Example 2

Different compatibilizers and polymeric toughening agents were studied in thermoplastic polymer blends of 87 wt % PET/10 wt % PTA/3 wt % compatibilizer. Detailed formulations of the studied blends are included in Table 3.

The blends were compounded using the same Coperion twin-screw extruder as in Example 1, and injection molded to make test samples under same processing conditions.

PET-1 is described above. Three different polymeric toughening agents were tested. PTA-1 is described above. PTA-2 is a propylene-based elastomer including 9 wt % ethylene, sold under the trade name VISTAMAXX™ 3980 polymer by ExxonMobil Chemical Company. PTA-3 is a propylene-based elastomer including 4 wt % ethylene, sold under the trade name VISTAMAXX™ 3588 polymer by ExxonMobil Chemical Company. In general, a higher ethylene content induces a lower propylene crystallinity in the material promoting elastomeric behavior. Reduced crystallinity increases effectiveness as a toughening agent for more rigid resins.

Four different compatibilizers were evaluated. C-1 is described above. C-2 is an ethylene acrylic acid (EAA) copolymer sold under the trade name ESCOR™ 5100 EAA by ExxonMobil Chemical Company. C-3 is a MAH-g polypropylene copolymer sold under the trade name OPTI-PREN™ 11 MA13 by BJØRN THORSEN. C-3 has a lower MAH content and lower backbone ethylene content as compared to C-1. C-4 is a MAH-g high density polyethylene sold under the trade name EXXELOR™ 1040 polyethylene by ExxonMobil Chemical Company.

TABLE 3

Sample compositions (wt %)

| Sample | 1 | 6 | 4 | 7 | 8 | 9 | 10 | 11 | 12 | 13 | 14 | 15 | 16 |
|---|---|---|---|---|---|---|---|---|---|---|---|---|---|
| PET-1 | 100 | 87 | 87 | 87 | 87 | 87 | 87 | 87 | 87 | 87 | 87 | 87 | 87 |
| PTA-1 | — | 10 | 10 | 10 | 10 | — | — | — | — | — | — | — | — |
| PTA-2 | — | — | — | — | — | 10 | 10 | 10 | 10 | — | — | — | — |
| PTA-3 | — | — | — | — | — | — | — | — | — | 10 | 10 | 10 | 10 |
| C-2 | — | 3 | — | — | — | 3 | — | — | — | 3 | — | — | — |
| C-1 | — | — | 3 | — | — | — | 3 | — | — | — | 3 | — | — |
| C-3 | — | — | — | 3 | — | — | — | 3 | — | — | — | 3 | — |
| C-4 | — | — | — | — | 3 | — | — | — | 3 | — | — | — | 3 |

TABLE 4

Tensile, Impact, and Flow Properties

| Sample | 1 | 6 | 4 | 7 | 8 | 9 | 10 | 11 | 12 | 13 | 14 | 15 | 16 |
|---|---|---|---|---|---|---|---|---|---|---|---|---|---|
| MFR (265° C./2.16 kg) [g/10 min] | 15 | 22 | 43 | 32 | 23 | 21 | 40 | 36 | 25 | 23 | 31 | 33 | 22 |
| RTNI [kJ/m$^2$] | 3.8 | 9.0 | 12.4 | 11.7 | 6.8 | 6.1 | 9.2 | 8.6 | 4.8 | 4.6 | 6.3 | 6.0 | 4.7 |
| LTNI [kJ/m$^2$] | 3.2 | 4.2 | 6.6 | 5.6 | 4.4 | 4.2 | 5.0 | 4.1 | 4.2 | 3.4 | 3.8 | 4.1 | 4.1 |
| Yield Strength [MPa] | 71.1 | 49.6 | 50.2 | 50.4 | 49.4 | 50.2 | 50.2 | 50.2 | 50.0 | 51.6 | 50.9 | 51.7 | 51.7 |
| Elastic Modulus [GPa] | 2747 | 2075 | 2119 | 2169 | 2070 | 2158 | 2125 | 2112 | 2152 | 2158 | 2229 | 2230 | 2204 |
| Flex Modulus [MPa] | 2776 | 2005 | 2036 | 1979 | 1963 | 2030 | 2010 | 2010 | 2076 | 2134 | 2051 | 2062 | 2087 |

The greatest notched impact strength improvement is with Samples 4 and 6-8, which include PTA-1. PTA-1 includes the highest ethylene content as compared to PTA-2 and PTA-3. Greater ethylene content is thus correlated with greater notched impact strength. A decrease of around 25% in the flexural and elastic moduli is observed with addition of each type of PTA and with the use of each type of compatibilizer.

TABLE 5

Notched Izod impact strength [kJ/m$^2$] at different test temperatures

| Test temperature | 1 | 6 | 4 | 7 | 8 | 9 | 10 | 11 | 12 | 13 | 14 | 15 | 16 |
|---|---|---|---|---|---|---|---|---|---|---|---|---|---|
| Room temperature | 3.8 | 9.0 | 12.4 | 11.7 | 6.8 | 6.1 | 9.2 | 8.6 | 4.8 | 4.6 | 6.3 | 6.0 | 4.7 |
| 0° C. | 3.6 | 6.8 | 9.6 | 8.1 | 4.7 | 4.8 | 6.8 | 5.1 | 4.8 | 4.0 | 4.8 | 4.7 | 4.7 |
| −10° C. | 3.1 | 4.8 | 7.9 | 6.3 | 4.6 | 4.3 | 5.4 | 4.6 | 4.6 | 3.6 | 4.7 | 4.2 | 4.5 |
| −20° C. | 3.2 | 4.2 | 6.6 | 5.6 | 4.4 | 4.2 | 5.0 | 4.1 | 4.2 | 3.4 | 3.8 | 4.1 | 4.1 |

Table 5 shows the notched Izod impact strength for Samples 1, 4, and 6-16 at room temperature, 0° C., −10° C., and −20° C. Samples 8, 12, and 16, which include C-4, a MAH-g polyolefin, show less improved RTNI as compared to samples incorporating C-1, C-2, or C-3. As such, not every MAH-g polyolefin may act as an effective compatibilizer. However, Samples 6, 9, and 13, which include C-2, an ethylene acrylic acid (EAA) copolymer, do show comparable impact improvements to Samples including C-1 and C-3. As such, EAA copolymers may provide a viable alternative to MAH-g polyolefins in order to toughen PET using a propylene-based elastomer toughening agent.

Figure 10:
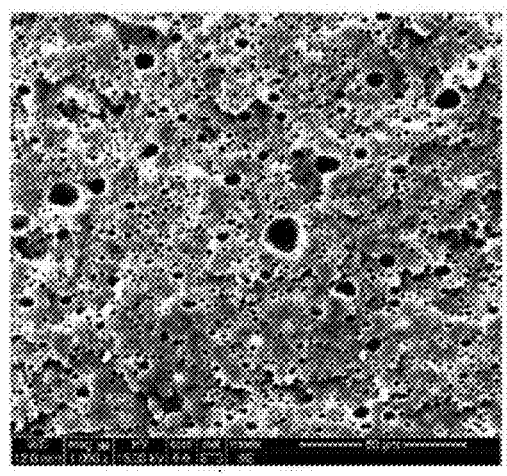
FIG. 10 illustrates a scanning electron micrograph of a thermoplastic polymer blend, according to an embodiment of the invention.
Figure 11:
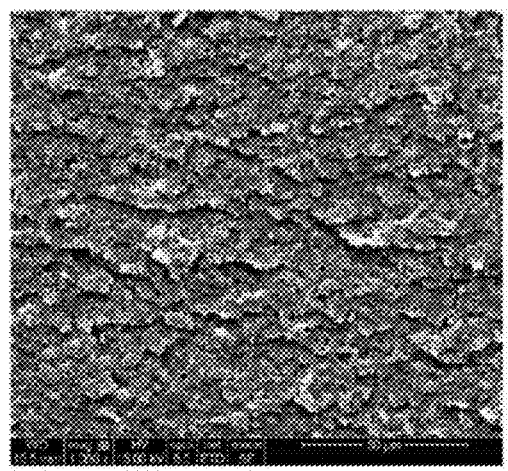
FIG. 11 illustrates a scanning electron micrograph of a thermoplastic polymer blend, according to an embodiment of the invention.
Figure 12:
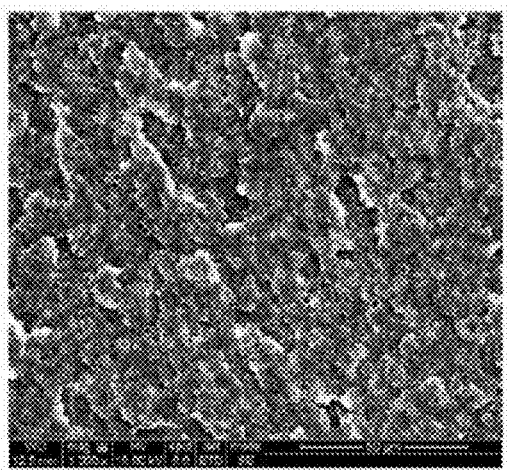
FIG. 12 illustrates a scanning electron micrograph of a thermoplastic polymer blend, according to an embodiment of the invention.

A central aspect of the proposed thermoplastic blend is the ability to disperse the PTA in the PET matrix. With use of certain compatibilizers, well dispersed elastomeric domains of small size are observed. FIGS. 10, 11 and 12 illustrate scanning electron microscopy (SEM) micrographs of the fracture surface of Samples 8, 6 and 4, respectively, tested at 0° C. The PTA component has been extracted from the sample surface using toluene. FIG. 10 illustrates Sample 8, including C-4 and exhibiting large PTA domains. Large domains are related to poor impact properties. The correct selection of the compatibilizer type is important in controlling the domain size and the subsequent impact strength. FIG. 11 illustrates Sample 6, and FIG. 12 illustrates Sample 4. Both Samples 6 and 4 have much smaller domains of PTA and superior notched impact performance is achieved.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A thermoplastic polymer blend, comprising:
   from about 50 wt % to about 98 wt % polyethylene terephthalate (PET);
   a polymeric toughening agent, wherein the polymeric toughening agent is a propylene-based elastomer, wherein the propylene-based elastomer comprises from about 75 wt % to about 97 wt % propylene-derived units and from about 3 wt % to about 20 wt % units derived from ethylene and/or C4 to C12 α-olefins based on the weight of the propylene-based elastomer; and
   a compatibilizer, wherein the compatibilizer is selected from the group consisting of a maleic-anhydride functionalized polypropylene copolymer and an ethylene acrylic acid copolymer,
   wherein the ratio of wt % compatibilizer to wt % polymeric toughening agent, based on the total weight of the thermoplastic polymer blend, is from about 0.1 to about 0.4.

2. The thermoplastic polymer blend of claim 1, wherein the ratio of wt % compatibilizer to wt % polymeric toughening agent, based on the total weight of the thermoplastic polymer blend, is from about 0.25 to about 0.35.

3. The thermoplastic polymer blend of claim 1, comprising from about 1 wt % to about 30 wt % of the polymeric toughening agent based on the total weight of the thermoplastic polymer blend.

4. The thermoplastic polymer blend of claim 1, comprising from about 5 wt % to about 15 wt % of the polymeric toughening agent based on the total weight of the thermoplastic polymer blend.

5. The thermoplastic polymer blend of claim 1, comprising from about 0.25 wt % to about 10 wt % of the compatibilizer based on the total weight of the thermoplastic polymer blend.

6. The thermoplastic polymer blend of claim 1, comprising from about 2 wt % to about 4 wt % of the compatibilizer based on the total weight of the thermoplastic polymer blend.

7. The thermoplastic polymer blend of claim 1, further comprising a nucleating agent.

8. The thermoplastic polymer blend of claim 1, wherein the PET is selected from the group consisting of recycled material, post-consumer material and post-industrial material.

9. The thermoplastic polymer blend of claim 1 wherein the propylene-based elastomer has an mm propylene triad tacticity of at least 75%, and wherein the propylene-based elastomer has a heat of fusion of less than 75 J/g.

10. The thermoplastic polymer blend of claim 9, wherein the propylene-based elastomer is a propylene-ethylene copolymer having a melt flow rate at 230° C./2.16 kg of less than 50 g/10 min.

11. The thermoplastic polymer blend of claim 9, wherein the propylene-based elastomer comprises greater than 10 wt % ethylene based on the weight of the propylene-based elastomer.

12. The thermoplastic polymer blend of claim 1, wherein the polymer blend has a crystallization temperature that is at least 10° C. greater than the crystallization temperature of the PET.

13. The thermoplastic polymer blend of claim 1, wherein the polymer blend has a crystallization temperature greater than about 200° C.

14. The thermoplastic polymer blend of claim 1, wherein the compatibilizer is a maleic anhydride functionalized polyolefinic elastomer.

15. The thermoplastic polymer blend of claim 1, wherein the compatibilizer is an an ethylene acrylic acid copolymer (EAA).

16. The thermoplastic polymer blend of claim 1, wherein the thermoplastic polymer blend has a notched impact strength that is at least 3 times greater than the notched impact strength of the PET alone, as measured by ISO 180/1A at 23° C.

17. The thermoplastic polymer blend of claim 1, wherein the thermoplastic polymer blend has a low temperature notched impact strength that is at least 2 times greater than the low temperature notched impact strength of the PET, as measured by ISO 180/1A at −20° C.

18. The thermoplastic polymer blend of claim 1, wherein the thermoplastic polymer blend has at least one of a flexural modulus and an elastic modulus that is at least 25% less than the corresponding modulus of the PET, as measured by ISO 178.

19. An article comprising the thermoplastic polymer blend of claim 1.

20. The article of claim 19, wherein the article is an injection molded part comprising a PET matrix and dispersed propylene-based elastomer domains, and wherein the dispersed domains have a mean domain size greater than about 0.1 µm and less than about 1 µm as measured by AFM.

* * * * *